US009356668B2

(12) United States Patent  
Zhang et al.

(10) Patent No.: US 9,356,668 B2  
(45) Date of Patent: May 31, 2016

(54) METHOD AND APPARATUS FOR PREDICTING PRECODING MATRIX IN MIMO SYSTEM

(75) Inventors: Yu Zhang, Beijing (CN); Dalin Zhu, Beijing (CN); Zhennian Sun, Beijing (CN); Ming Lei, Beijing (CN)

(73) Assignee: NEC (CHINA) CO., LTD., Beijing (CN)

( * ) Notice: Subject to any disclaimer, the term of this patent is extended or adjusted under 35 U.S.C. 154(b) by 57 days.

(21) Appl. No.: 13/996,376

(22) PCT Filed: Feb. 28, 2011

(86) PCT No.: PCT/CN2011/071410
§ 371 (c)(1),
(2), (4) Date: Sep. 10, 2013

(87) PCT Pub. No.: WO2012/116487
PCT Pub. Date: Sep. 7, 2012

(65) Prior Publication Data
US 2013/0343481 A1    Dec. 26, 2013

(51) Int. Cl.
*H04B 7/02* (2006.01)
*H04B 7/04* (2006.01)

(52) U.S. Cl.
CPC .................................. *H04B 7/0456* (2013.01)

(58) Field of Classification Search
CPC .. H04B 7/0456; H04B 7/0408; H04B 7/0417; H04B 7/0478
USPC ......................................................... 375/267
See application file for complete search history.

(56) References Cited

U.S. PATENT DOCUMENTS

| 5,852,630 | A  | * | 12/1998 | Langberg et al. ............. 375/219 |
| 7,702,029 | B2 | * | 4/2010  | Kotecha et al. ............... 375/267 |
| 2007/0198699 | A1 | * | 8/2007  | Peracha et al. ................ 709/224 |
| 2007/0206626 | A1 |   | 9/2007  | Lee et al. |
| 2011/0013563 | A1 | * | 1/2011  | Sivanesan et al. ............. 370/328 |

FOREIGN PATENT DOCUMENTS

| CN | 101938337 A | 1/2011 |
| CN | 101964695 A | 2/2011 |

OTHER PUBLICATIONS

Inoue, T., et al. "Grassmannian Predictive Coding for Delayed Limited Feedback MIMO Systems" Forty-Seventh Annual Allerton Conference. Sep. 2009. pp. 783-788.

Nguyen, H., et al. "Precoder and Decoder Prediction in Time-Varying MIMO Channel" First IEEE International Workshop on Computational Advances in Multi-Sensor Adaptive Processing. Dec. 2005. (6 Pages).

Zhang, H., et al. "A Reduced CSI Feedback Approach for Precoded MIMO-OFDM Systems" IEEE Transactions on Wireless Communications, vol. 6, No. 1. Jan. 2007. pp. 55-58.

* cited by examiner

*Primary Examiner* — David S Huang
(74) *Attorney, Agent, or Firm* — Tutunjian & Bitetto, P.C.

(57) ABSTRACT

A method for predicting precoding matrix (PM) in a MIMO System includes the steps of: obtaining a present PM based on a present transmission; fitting the present PM and previous PMs with a predefined model; and determining a forthcoming PM which is expected to be used in the next transmission based on the fitting.

23 Claims, 7 Drawing Sheets

GSP codebook      Focalizing

METHOD AND APPARATUS FOR PREDICTING PRECODING MATRIX IN MIMO SYSTEM

FIELD OF THE INVENTION

Embodiments of the present invention generally relate to wireless communication. More particularly, embodiments of the present invention relate to a method and apparatus for predicting a precoding matrix in a MIMO System.

BACKGROUND OF THE INVENTION

In multiple-input multiple-output (MIMO) systems, linear precoding based spatial multiplexing is a promising technique. It provides higher data rate by enabling parallel multi-stream transmission in MIMO fading channels by exploiting the full or partial channel state information at the transmitter (CSIT), for example, the precoding matrix. For frequency division duplexing (FDD) systems, the precoding matrix is available via a finite-rate feedback channel through which the receiver sends the channel information to the transmitter periodically or aperiodically. For time division duplexing (TDD) systems, the precoding matrix may be available by exploiting channel reciprocity at the transmitter directly.

U.S. Patent Publication No. US2007/0206626A1, entitled "Apparatus and method for determining beamforming vector in a codebook-based beamforming system", filed on Feb. 5, 2007, discloses that at the receiver in a codebook-based transmission beamforming system, forthcoming channel values for a forthcoming period are generated using M present and previous channel estimates by means of minimum mean square error (MMSE) filter, a.k.a, the Wiener filter.

In paper "Grassmannian predictive coding for delayed limited feedback MIMO systems," T. Inoue and R. W. Heath, Jr., in Proc. 47th Allerton Conf. Commun., Contr., Comput. Sep. 30-Oct. 2, 2009, pp. 783-788, a receiver predicts the forthcoming channel direction along the geodesic passing through the present and previous channel direction observations with a long-term feedback optimal step size.

However, the method disclosed by U.S. Patent Publication No. 2007/0206626A1 badly depends on accurate estimation of the temporal correlation of the MIMO channel. With respect to the paper "Grassmannian predictive coding for delayed limited feedback MIMO systems," it is designed for a beamforming system where only a single data stream is transmitted. Henceforth, it cannot handle spatial multiplexing where multiple streams are pending for parallel transmission.

SUMMARY OF THE INVENTION

In view of the foregoing problems in the existing approaches, there is a need in the art to provide methods and apparatuses for predicting a precoding matrix in a MIMO system.

According to a first aspect of the present invention, embodiments of the invention provide a method for predicting a precoding matrix (PM) in a MIMO System. The method may comprise steps of: obtaining a present PM based on the present transmission; fitting the present PM and previous PMs with a predefined model; and determining a forthcoming PM which is expected to be used in the next transmission based on the fitting.

According to a second aspect of the present invention, embodiments of the invention provide a method for communication with a predicted PM in a FDD MIMO system. The method may comprise steps of: predicting a forthcoming PM which is expected to be used in the next transmission by using the method according to the first aspect; obtaining a quantized focusing factor and a quantized index of the target PM by using the method according to the first aspect; and feeding back the quantized focusing factor and the quantized index of the target PM to a transmitter.

According to a third aspect of the present invention, embodiments of the invention provide a method for communication with a predicted PM in a FDD MIMO system. The method may comprise steps of: receiving a quantized focusing factor and a quantized index of the target PM obtained by using the method according to the first aspect; restoring a forthcoming PM which is expected to be used in the next transmission, based on a root codebook and the quantized focusing factor and the quantized index of the target PM; and performing the next transmission to a receiver by using the forthcoming PM.

According to a fourth aspect of the present invention, embodiments of the invention provide a method for communication with a predicted PM in a TDD MIMO system. The method may comprise steps of: predicting a PM which is expected to be used in a next transmission by using the method according to the first aspect; and performing the next transmission to a receiver by using the predicted PM.

According to a fifth aspect of the present invention, embodiments of the invention provide a method for communication with a predicted PM in a TDD MIMO system. The method may comprise steps of: receiving, from a transmitter, a transmission encoded with a PM which is predicted by using the method according to the first aspect.

According to a sixth aspect of the present invention, embodiments of the invention provide an apparatus for predicting PM in a MIMO System. The apparatus may comprise: an obtaining device, configured to obtain a present PM based on the present transmission; a fitting device, configured to fit the present PM and previous PMs with a predefined model; and a determining device, configured to determine a forthcoming PM which is expected to be used in the next transmission based on the fitting.

According to a seventh aspect of the present invention, embodiments of the invention provide a receiver in a FDD MIMO system. The receiver may comprise: a predicting device, configured to predict a forthcoming PM which is expected to be used in the next transmission by using the method according to the first aspect; an obtaining device, configured to obtain quantized focusing factor and a quantized index of the target PM by using the present methods; and a feedback device, configured to feed back the quantized focusing factor and the quantized index of the target PM to a transmitter.

According to an eighth aspect of the present invention, embodiments of the invention provide a transmitter in a FDD MIMO system. The transmitter may comprise: a receiving device, configured to receive a quantized focusing factor and a quantized index of the target PM obtained by using the method according to the first aspect; a restoring device, configured to restore a forthcoming PM which is expected to be used in the next transmission, based on a root codebook and the quantized focusing factor and the quantized index of the target PM; and a transmitting device, configured to perform the next transmission to a receiver by using the forthcoming PM.

According to a ninth aspect of the present invention, embodiments of the invention provide a transmitter in a TDD MIMO system. The transmitter may comprise: a predicting device, configured to predict a PM which is expected to be used in next transmission by using the method according to the first aspect; and a transmitting device, configured to perform the next transmission to a receiver by using the predicted PM.

According to a tenth aspect of the present invention, embodiments of the invention provide a receiver in a TDD MIMO system. The receiver may comprise: a receiving device, configured to receive, from a transmitter, transmission encoded with a PM which is predicted by using the method according to the first aspect.

The following benefits can be expected with the invention.

The tracking ability of transmit subspace (TSS) variation can be significantly improved with a reasonably low overhead. The estimation of the channel temporal correlation is not needed.

In a FDD system, the prediction is not required at the transmitter, but only at the receiver. Hence the designs of the transmitter and the receiver are decoupled.

Depending on the implementation of the prediction unit, the prediction steps can be multiple or fractional of the feedback period.

The overhead of feedback is low because there only are a long-term feedback and a short-term feedback.

The root codebook used in both a receiver and a transmitter initialization allows small memory for the codebook storage.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, where.

DETAILED DESCRIPTION OF EMBODIMENTS

Figure 1:
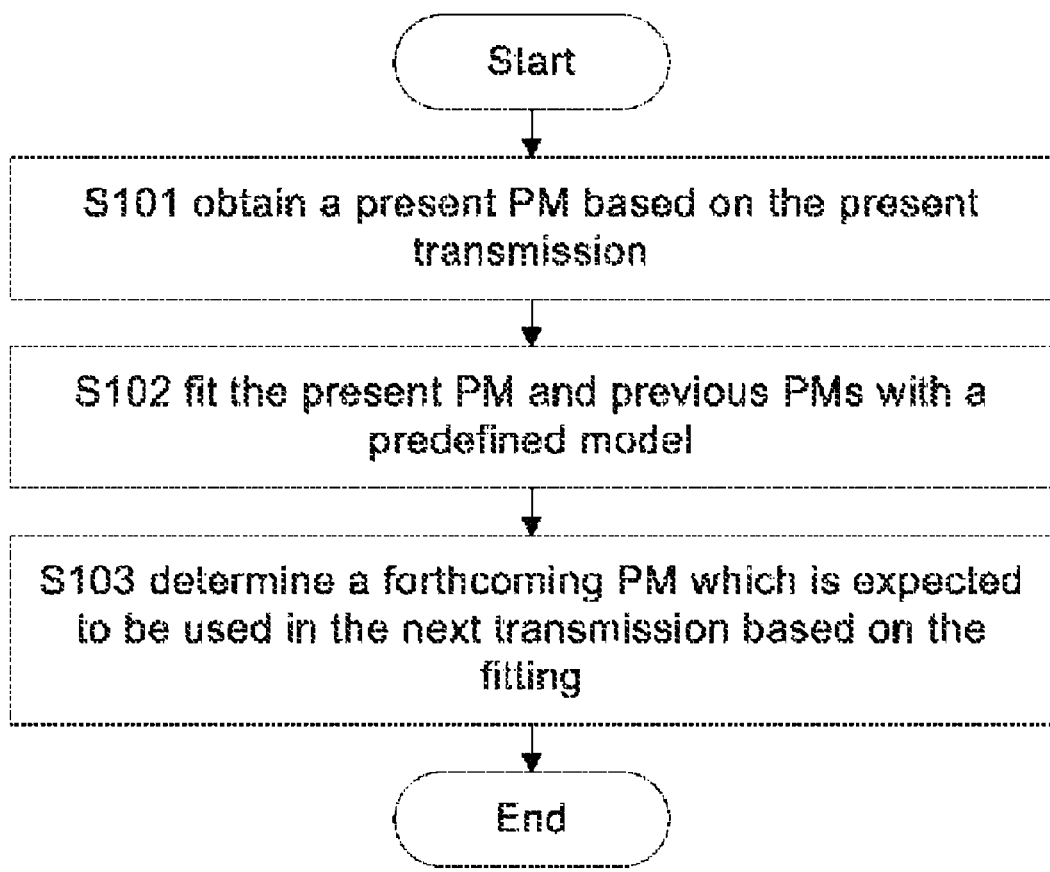
FIG. 1 illustrates a flow chart of the method for predicting PM in a MIMO System according to an embodiment of the invention.

Various embodiments of the present invention are described in detail with reference to the drawings. The flowcharts and block diagrams in the figures illustrate the apparatus, method, as well as architecture, functions and operations executable by a computer program product according to the embodiments of the present invention. In this regard, each block in the flowcharts or block may represent a module, a program, or a part of code, which contains one or more executable instructions for performing specified logic functions. It should be noted that in some alternatives, functions indicated in blocks may occur in an order differing from the order as illustrated in the figures. For example, two blocks illustrated consecutively may be actually performed in parallel substantially or in an inverse order, which depends on related functions. It should also be noted that block diagrams and/or each block in the flowcharts and a combination of thereof may be implemented by a dedicated hardware-based system for performing specified functions/operations or by a combination of dedicated hardware and computer instructions.

Below, terms used in the invention are explained for clarity purposes.

1. Present Precoding Matrix (PM)

Present PM is a precoding matrix. In a Frequency Division Duplexing (FDD) system, a present PM may be estimated by a receiver based on the received transmission from a transmitter at the present instant. In a Time Division Duplexing (TDD) system, a present PM may be a precoding matrix used by a transmitter in transmission at the present instant.

2. Previous PMs

In the embodiments of the invention, previous PMs are a set of precoding matrices which are actually used in the transmissions at several previous instants.

3. Previously Predicted PMs;

In the embodiments of the invention, previously predicted PMs are a set of precoding matrices which are predicted for the transmissions at previous instants before the present instant. Different with the previous PMs, the previously predicted PMs are predicted instead of actually used in the previous transmissions.

4. Forthcoming PM

A forthcoming PM is a precoding matrix which is expected to be used in the next transmission based on the fitting.

5. Error Metric

The term "error metric" is generally used to define the likelihood between two subspaces. For example, an error metric between two subspaces may be the chordal distance between two subspaces, the Fubini-Study distance between two subspaces, the projection-two norm between two subspaces, the Euclidean metric between two subspaces, and so on.

If there are two sets of PMs and the number of PMs in each set is N, the error metric between a pair of PMs, each belonging to a respective set, may be defined as above. The error metric between the two sets could be a function of the error metrics of N pairs of PMs. For example, the error metric between the two sets may be average of the error metrics of N pairs of PMs, maximum of the error metrics of N pairs of PMs, mean square of the error metrics of N pairs of PMs, and so on.

Note that, in the invention, term "present transmission" refers to the transmission at the present instant; term "next transmission" refers to the transmission at the next instant after the present instant; and term "previous transmissions" refers to the transmissions at the previous instants before the present instant.

An embodiment of the present invention discloses a method for predicting PM in a MIMO System. In the method, first, a present PM is obtained based on the present transmission, then the present PM and previous PMs are fitted with a predefined model, and a forthcoming PM, which is expected to be used in the next transmission, are determined based on the fitting.

FIG. 1 illustrates a flow chart of the method for predicting PM in a MIMO System according to an embodiment of the invention.

At step S101, a present PM is obtained based on the present transmission.

In an embodiment of the invention, the MIMO system is a FDD system. The present PM may be estimated by a receiver based on the received transmission from a transmitter at the present instant.

In another embodiment of the invention, the MIMO system is a TDD system. The present PM may be a precoding matrix used by a transmitter in transmission at the present instant. Hence, the present PM can be obtained directly from relevant information of the present transmission.

As can be appreciated by a skilled in the art, although embodiments of the present invention provide limited examples for obtaining a present PM based on the present transmission, many other suitable means known in the art may be adopted for implementing step S101.

At step S102, the present PM and previous PMs are fitted with a predefined model.

In an embodiment of the invention, the predefined model used in the process of fitting may be optimized before performing the fitting. Assuming a plurality of predefined models, for example, geodesic, B-spline, cubic spline, and so on, to fit a set of the present PM and previous PMs better, goodness-of-fit of the predefined models may be evaluated based on the present PM and the previous PMs. For example, an error metric between each of the plurality of models and a set of present PM and the previous PMs may be calculated, and the model corresponding to the minimum error metric may be determined as a model with the best goodness-of-fit. Then, the model with the best goodness-of-fit may be selected as the predefined model to be used in the fitting. Thus, the model used in the process of fitting is optimized, so that the present PM and previous PMs can be fitted better with this model.

In an embodiment of the invention, the present PM and previous PMs may be fitted with a curve on the Grassmannian manifold.

At step S103, a forthcoming PM, which is expected to be used in the next transmission, is determined based on the fitting.

In an embodiment of the invention, a forthcoming PM may be determined by determining a step size based on the fitting, for example, the fitting of step S102; extrapolating on the fitting result with the step size, based on the predefined model; and obtaining the forthcoming PM based on the extrapolation.

The step size may be optimized by several ways, for example, by defining a plurality of PMs by using different step sizes based on the fitting, calculating an error metric between each of the plurality of PMs and a set of the previous PMs, and determining a step size corresponding to the maximum error metric.

As can be appreciated by a skilled in the art, many other suitable means known in the art may be adopted for optimizing the step size, and the method illustrated herein is only shown as an example rather than limitation.

Then, the flow of the embodiment of FIG. 1 ends.

Figure 2:
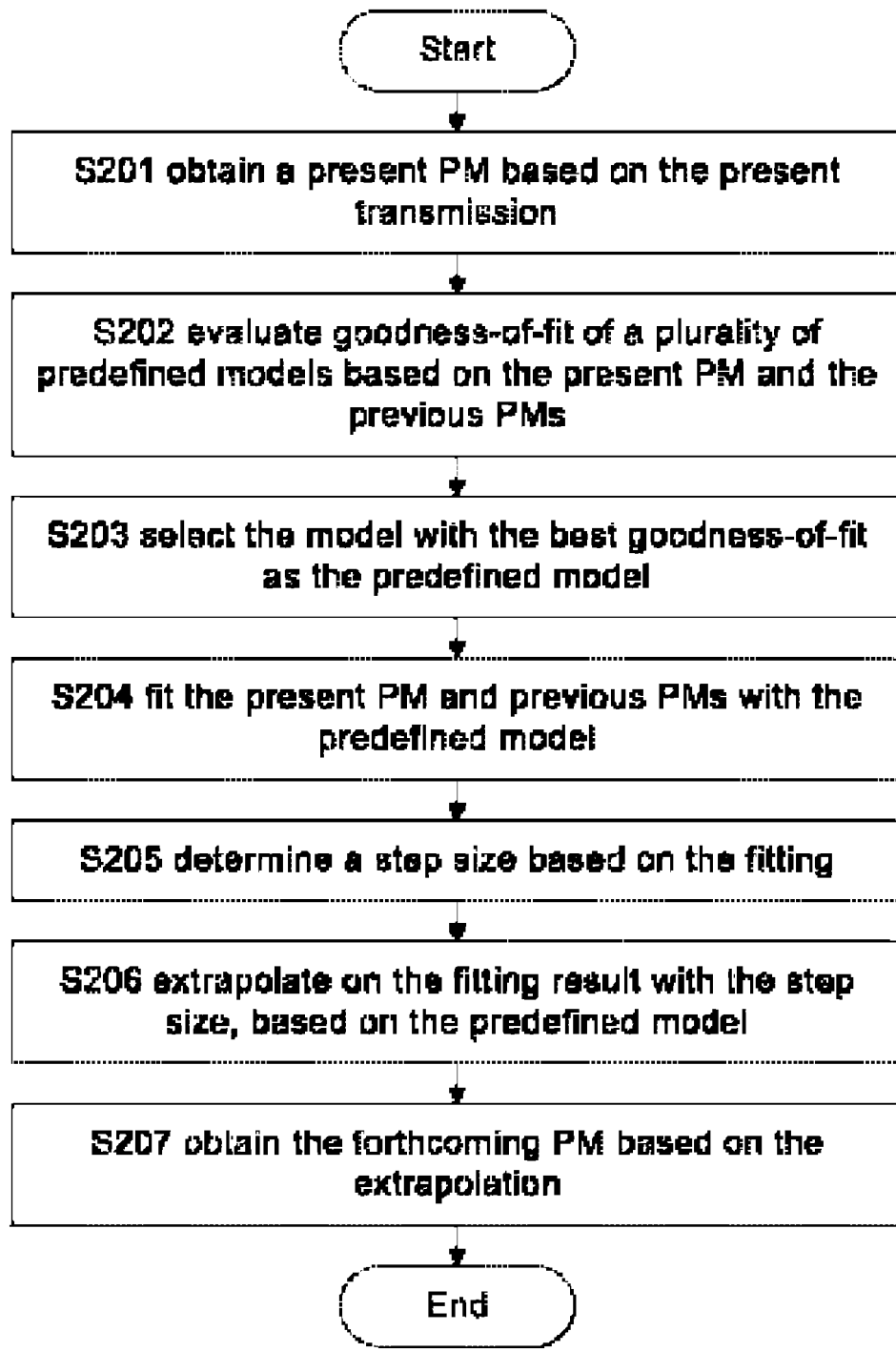
FIG. 2 illustrates a flow chart of the method for predicting PM in a MIMO System according to an embodiment of the invention.

FIG. 2 illustrates a flow chart of the method for predicting PM in a MIMO System according to an embodiment of the invention. The embodiment illustrated in FIG. 2 improves the embodiment of FIG. 1 in two aspects, one is optimizing the model used for fitting the present PM and previous PMs, and the other is optimizing the step size for extrapolation on the fitting result so as to obtain a better determination of the forthcoming PM. As can be appreciated by those skilled in the art, both of the optimization of the model and the optimization of the step size are optimal, that is, the invention can also be implemented without these optimization processes.

At step S201, a present PM is obtained based on the present transmission.

The process of this step is similar as step S101. For example, in a FDD MIMO system, the present PM may be estimated by a receiver based on the received transmission from a transmitter at the present instant; and in a TDD MIMO system, the present PM may be a precoding matrix used by a transmitter in transmission at the present instant.

At step S202, goodness-of-fit of a plurality of predefined models is evaluated based on the present PM and the previous PMs.

Steps S202-S204 can be used to substitute step S102 in FIG. 1. Specifically, steps S202-S204 can fit the present PM and previous PMs with a predefined model, which is a model with best goodness-of-fit among a plurality of models.

In the embodiments of the invention, a plurality of models can be predefined. For example, a model may be geodesic, B-spline, cubic spline, and so on. As appreciated by those skilled in the art, these examples of models are described only for illustration, not for limitation.

There may be several ways to evaluate a plurality of predefined models. For example, an error metric between each of the plurality of models and a set of present PM and the previous PMs can be calculated; and the model corresponding to the minimum error metric can be determined as a model with the best goodness-of-fit.

In an embodiment of the invention, error metric between each of the plurality of models and a set of the present PM and the previous PMs can be calculated as follows. First, the instants of the present PM and the previous PMs can be determined; a set of points corresponding to the instants in a model can be obtained; the error metrics between each pair of the PMs set and points set can be calculated, for example, the error metrics each can be calculated as a chordal distance, Fubini-Study distance, projection-two norm, and so on; then, the error metric between the two sets, for example, the average, maximum, or mean square of the error metrics between each pair of the PMs set and points set, can be obtained.

As is mentioned above, an error metric between two PMs may be the chordal distance between two subspaces, the Fubini-Study distance between two subspaces, the projection-two norm between two subspaces, the Euclidean metric between two subspaces, etc.

At step S203, the model with the best goodness-of-fit is selected as the predefined model.

As in step S202, goodness-of-fit of a plurality of predefined models is evaluated, thus a plurality of values which represent the goodness-of-fit of the predefined models can be obtained. For example, it can be defined that the largest value corresponds the best goodness-of-fit. Hence, a model with the best goodness-of-fit can be selected according to the values.

At step S204, the present PM and previous PMs are fitted with the predefined model.

In an embodiment of the invention, the predefined model used in fitting the present PM and previous PMs is the Grassmannian manifold. In this embodiment, the present PM and previous PMs are fitted with a curve on the Grassmannian manifold.

As can be appreciated by those skilled in the art, a predefined model may be any other suitable model for fitting a plurality of precoding matrices, but not limited to the Grassmannian manifold.

At step S205, a step size is determined based on the fitting.

The step size can be determined in several ways. For example, the step size may be predetermined as a constant value. This value may be determined based on experience of those skilled in the art or any other proper way.

In an embodiment, a plurality of PMs may be defined by using different step sizes based on the fitting; an error metric between each of the plurality of PMs and a set of the previous PMs can be calculated; and a step size corresponding to the maximum error metric can be determined. In an example, there may be multiple different step sizes. Using one of these step sizes, a PM can be determined based on the fitting of S204, and an error metric between the PMs and each of the previous PMs can be calculated. After using every one of these step sizes, multiple PMs can be determined correspondingly and multiple error metrics can be obtained correspondingly. Then, by sorting error metric, the maximum one can be determined and the step size corresponding to the maximum error metric can be also determined.

At step S206, the fitting result is extrapolated with the step size based on the predefined model.

As can be appreciated by those skilled in the art, extrapolation can be implemented in multiple different ways, which are omitted herein for the purpose of brevity.

At step S207, the forthcoming PM is obtained based on the extrapolation.

In an embodiment of the invention, the MIMO system is a FDD system. The forthcoming PM may be predicted by a receiver and the receiver may signal the predicted forthcoming PM to the transmitter so as to be used in the next transmission.

In another embodiment of the invention, the MIMO system is a TDD system. The forthcoming PM may be predicted by a transmitter and the transmitter may use the predicted forthcoming PM in the next transmission.

Then, the flow of FIG. 2 ends.

Figure 3:
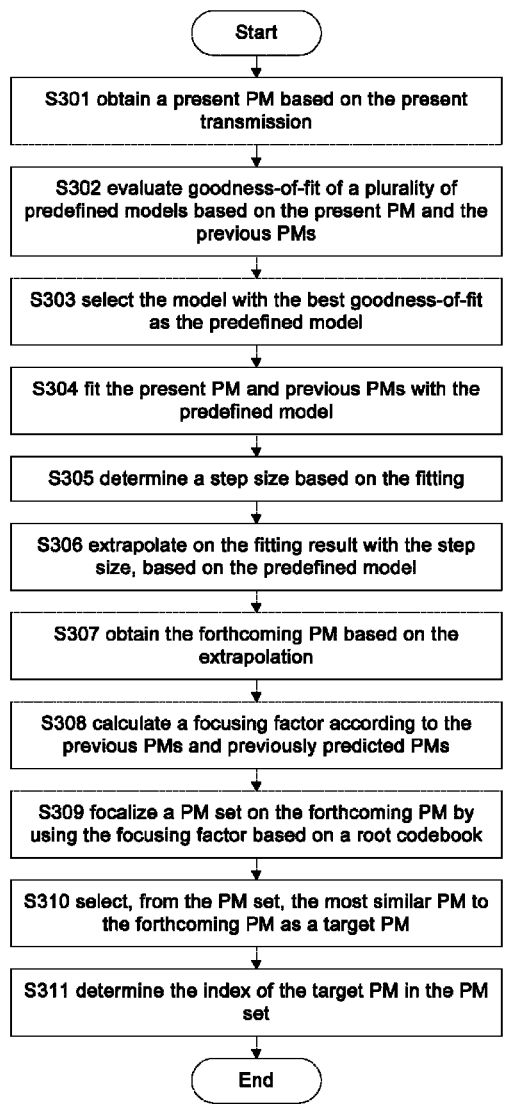
FIG. 3 illustrates a flow chart of the method for predicting PM in a MIMO System according to an embodiment of the invention.

FIG. 3 illustrates a flow chart of the method for predicting PM in a MIMO System according to an embodiment of the invention. The embodiment illustrated in FIG. 3 is another implementation of the embodiment of FIG. 2. In this embodiment, steps S301-S307 are similar to steps S201-S207, and steps S307-311 describe another implementation of step S207. In steps S308-311, a focusing factor and an index characterizing the forthcoming PM are obtained. This implementation is highly appreciated in a FDD system, because the receiver in the FDD system needs to feed back the predicted forthcoming PM to the transmitter. With the forthcoming PM being characterized by a focusing factor and an index, the feeding back from the receiver to the transmitter is simplified.

At step S301, a present PM is obtained based on the present transmission.

At step S302, goodness-of-fit of a plurality of predefined models is evaluated based on the present PM and the previous PMs.

At step S303, the model with the best goodness-of-fit is selected as the predefined model.

At step S304, the present PM and previous PMs are fitted with the predefined model.

At step S305, a step size is determined based on the fitting.

At step S306, the fitting result is extrapolated with the step size based on the predefined model.

At step S307, the forthcoming PM is obtained based on the extrapolation.

At step S308, a focusing factor is calculated according to the previous PMs and previously predicted PMs.

In an example, a plurality of candidate focusing factors can be predefined. Such candidate focusing factors may be predefined by those skilled in the art as needed or be predefined according to experience values. Then, with respect to one candidate focusing factor, an error metric between a previous PM and a previously predicted PM can be obtained so that the sum of the error metrics between the previous PMs and previously predicted PMs can be calculated. Note that, one sum corresponds to one of the plurality of candidate focusing factors. That is, one sum of error metrics between the previous PMs and previously predicted PMs can be calculated with one of a plurality of candidate focusing factors. After processing all of the plurality of candidate focusing factors, a plurality of sums can be obtained. Then, the candidate focusing factor corresponding to the minimum sum can be determined as the focusing factor.

In another embodiment, the focusing factor may be quantized so as to be fed back to a transmitter.

At step S309, a PM set is focalized on the forthcoming PM by using the focusing factor based on a root codebook.

A root codebook is a codebook basis, and any PM used in the transmission can be obtained based on this root codebook. In a FDD system, the root codebook is stored at both of the receiver side and the transmitter side, which is maintained identical in the transmission process.

Figure 4:
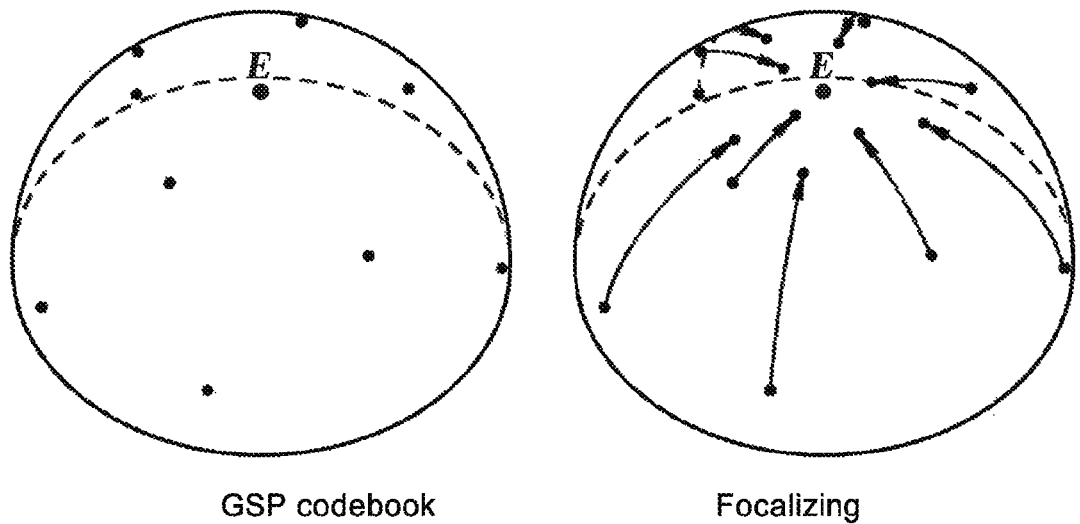
FIG. 4 illustrates an example of a GSP codebook and a schematic view of focalizing.

In an embodiment, the root codebook is a GSP codebook. FIG. 4 shows an example of a GSP codebook and the schematic view of focalizing. In this embodiment, a rotation matrix may be calculated based on the present PM and the reference point of the root codebook; a set of reference PMs may be focalized on the reference point by applying the focusing factor to the root codebook; then, the PM set may be calculated based on the rotation matrix and the set of reference PMs.

In a specific example, let $F=\{F_n:F_n \in U(M_t,M_s), n=1, 2, \ldots 2^{B_l}\}$ be a $B_l$ bit GSP codebook, where $M_t$ is the number of transmit antennas, $M_s$ is the number of parallel streams to be transmitted, $U(M_t,M_s)$ is the set of all $M_t \times M_s$ unitary matrices. The equivalent subspace is denoted with the representative W as W=[W], where [W] is the subspace spanned by columns of matrix W. The quantization of transmit subspace W=[W] with codebook F can be formulated as:

$$Q_{GSP}\{W;F\} = \arg\min_{F \in F} d([W], [F])$$

Given a focusing factor s, $s \in [0, 1)$, by focalizing each codeword in codebook F towards a predefined reference basis $E \in U(M_t,M_s)$, a new codebook with higher quantization accuracy can be constructed as $$F(s)=\{X(s;[F],[E]):F \in F\},$$

where X(s;[F],[E]) is the geodesic passing through [F] and [E], and s is the focusing factor. [F] is the subspace spanned by columns of matrix F, and [E] is the subspace spanned by columns of matrix E.

Note that, $F(0)=F$, and $F(s) \rightarrow \{E\}$ as $s \rightarrow 1$. Given a PM denoted as $W_k$, there exists a unitary matrix $U_k \in U(M_t,M_t)$, such that $U_k^H W_k = E$, where $(\cdot)^H$ denotes the conjugate transpose.

The forthcoming PM is denoted as $\tilde{W}(t)$. The quantization of the $\tilde{W}(t)$ with F(s) can be defined as:

$$Q_{DFC}\{\tilde{W}(t);F,s\}=U_k \cdot Q_{GSP}\{U_k^H \tilde{W}(t);F(s)\}.$$

To find an optimal reference basis with a fixed GSP codebook is equivalent to find an optimal rotation matrix with a fixed reference basis. In an example, a reference basis is as follows.

$$E = \begin{pmatrix} I_{M_s} \\ 0 \end{pmatrix},$$

where $I_{M_s}$ is the $M_s$-dimensional identity matrix.

An example of rotation matrix can be given by:

$$U_{rot} = \underset{U \in U(M_t, M_t)}{\operatorname{argmin}} \sum_{F \in F(U)} |d([E], [F]) - \bar{d}(E, F(U))|^2,$$

where $d([E],[F])$ is the error metric defined above, for example, the chordal distance between two subspaces; and $\tilde{d}(E,F(U))$ is the mean error metric between E and each codeword in $F(U)=\{UF:F\epsilon F\}$. For example, $\tilde{d}(E,F(U))$ can be calculated as follows:

$$\bar{d}(E, F(U)) = \frac{1}{|F(U)|} \sum_{F \in F(U)} d([E], [UF]),$$

where $|F(U)|$ is the cardinality of set $F(U)$.

With the calculated rotation matrix, the set of reference PMs can be used to obtain a PM set by using the rotation matrix. For example, a PM can be calculated by multiplying one PM of the set of reference PM with the rotation matrix. Thus, a PM set can be obtained by multiplying each of the set of reference PM with the rotation matrix one by one.

At step S310, the most similar PM to the forthcoming PM is selected from the PM set as a target PM.

At step S311, the index of the target PM in the PM set is determined.

The index indicates the position of the target PM in the PM set. Using the index, one can easily obtain the target PM from the PM set. In an embodiment of the invention, the index can be quantized so as to be feed back to a transmitter.

Then, the flow of FIG. 3 ends.

Figure 5:
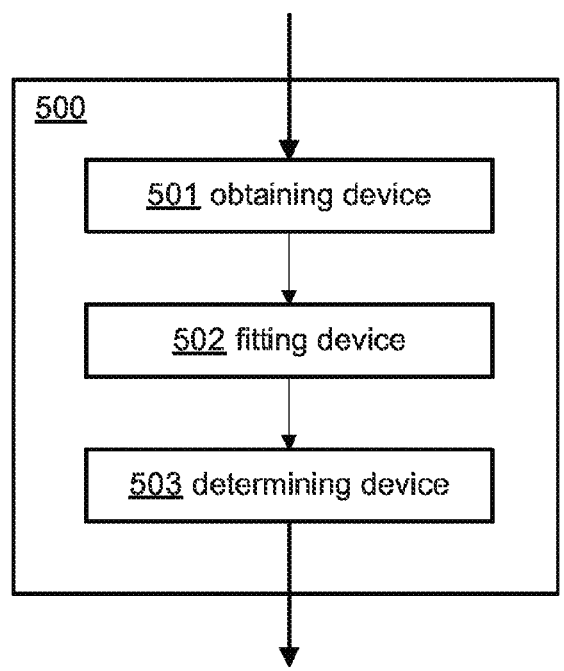
FIG. 5 illustrates a block diagram of an apparatus for predicting PM in a MIMO System according to an embodiment of the invention.

FIG. 5 illustrates a block diagram of an apparatus 500 for predicting PM in a MIMO System according to an embodiment of the invention.

The apparatus 500 may comprise: an obtaining device 501, configured to obtain a present PM based on the present transmission; a fitting device 502, configured to fit the present PM and previous PMs with a predefined model; and a determining device 503, configured to determine a forthcoming PM which is expected to be used in the next transmission based on the fitting.

In an embodiment of the invention, the fitting device 502 may comprise: means for evaluating goodness-of-fit of a plurality of predefined models based on the present PM and the previous PMs; and means for selecting the model with the best goodness-of-fit as the predefined model. In an implementation, the means for evaluating goodness-of-fit of the plurality of models based on the present PM and the previous PMs may comprise: means for calculating an error metric between each of the plurality of models and a set of the present PM and the previous PMs; and means for determining the model corresponding to the minimum error metric as a model with the best goodness-of-fit.

In an embodiment of the invention, the fitting device 502 may comprise: means for fitting the present PM and previous PMs with a curve on the Grassmannian manifold.

In an embodiment of the invention, the determining device 503 may comprise: means for determining a step size based on the fitting; means for extrapolating on the fitting result with the step size, based on the predefined model; and means for obtaining the forthcoming PM based on the extrapolation.

In an implementation, the means for determining a step size based on the fitting may comprise: means for defining a plurality of PMs by using different step sizes based on the fitting; means for calculating an error metric between each of the plurality of PMs and a set of the previous PMs; and means for determining a step size corresponding to the maximum error metric.

In an implementation, the means for obtaining the forthcoming PM based on the extrapolation may comprise: means for calculating a focusing factor according to the previous PMs and previously predicted PMs; means for focalizing a PM set on the forthcoming PM by using the focusing factor based on a root codebook; means for selecting, from the PM set, the most similar PM to the forthcoming PM as a target PM; and means for determining the index of the target PM in the PM set.

In an example of the implementation, the means for calculating a focusing factor according to the previous PMs and previously predicted PMs may comprise: means for calculating, with one of a plurality of candidate focusing factors, the sum of error metrics between the previous PMs and previously predicted PMs, wherein one sum corresponds to one of the plurality of candidate focusing factors; means for determining the candidate focusing factor corresponding to the minimum sum as the focusing factor; and means for quantizing the focusing factor so as to be fed back to a transmitter.

In an example of the implementation, the means for focalizing a PM set on the present PM by using the focusing factor based on a root codebook may comprise: means for calculating a rotation matrix based on the present PM and the reference point of the root codebook; means for focalizing a set of reference PMs on the reference point by applying the focusing factor to the root codebook; and means for calculating the PM set based on the rotation matrix and the set of reference PMs.

In an example of the implementation, the means for determining the index of the target PM in the PM set may further comprise: means for quantizing the index so as to be fed back to a transmitter.

The apparatus 500 for predicting PM in a MIMO System illustrated in FIG. 5 can implement the embodiments of the invention, such as any of the embodiments illustrated in FIGS. 1-3.

Figure 6:
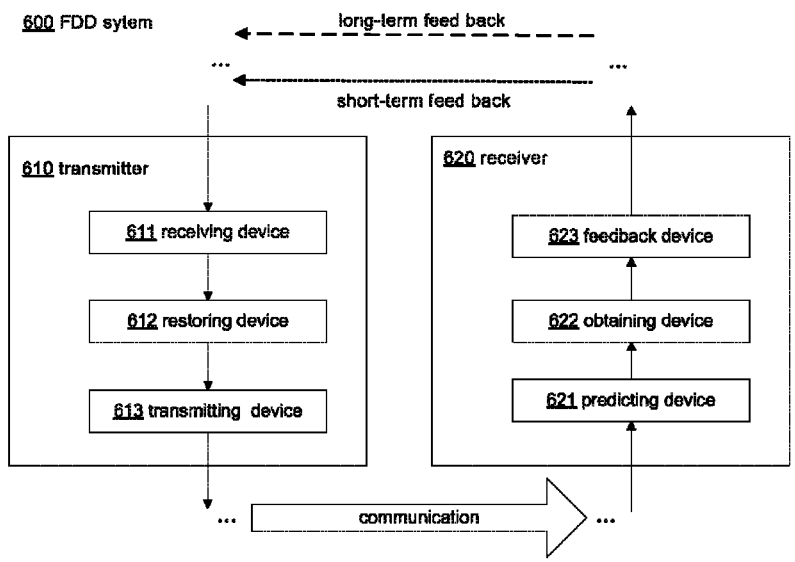
FIG. 6 illustrates block diagrams of a transmitter and a receiver in a FDD MIMO system according to an embodiment of the invention.

FIG. 6 illustrates block diagrams of a transmitter and a receiver in a FDD MIMO system 600 according to an embodiment of the invention.

Any set of precoding matrices ("codebook") can be viewed as covering a certain range of possible precoding matrices with a certain precoding resolution or accuracy. When designing codebook-based feedback schemes, precoding accuracy and precoding range are often traded off against feedback bandwidth. For example, although a large codebook may cover a large precoding range at high precoding accuracy, such a codebook typically requires large feedback bandwidth in order to signal the preferred precoding matrices. A small codebook requires less feedback bandwidth, but this bandwidth saving typically comes at the expense of smaller precoding range and/or poorer precoding accuracy.

In some embodiments of the invention, the receiver signals the channel feedback to the transmitter at two granularities: selection of the sub-codebook, for example, the focusing factor obtained at step S308, is signaled at a relatively coarse granularity (also called "long-term feedback"); while selection of the preferred precoding matrix within the selected sub-codebook, for example, the index obtained at step S311, is signaled at finer granularity (also called "short-term feedback"). In an example embodiment, the receiver selects a (possibly different) sub-codebook every several Transmission Time Intervals (TTIs) based on a focusing factor, and chooses a preferred precoding matrix from the currently-selected sub-codebook every TTI based on a precoding matrix indicator, for example, the index obtained at step S311.

Since the receiver selects the preferred precoding matrices only from a partial sub-codebook and not from the entire codebook, the number of bits needed for signaling the selected matrices is small. Signaling of the valid codebook is carried out at coarse granularity that has little effect on feedback bandwidth. Thus, feedback bandwidth is reduced without degradation in precoding range or accuracy.

In FIG. 6, system 600 may be an LTE or LTE-A system. In alternative embodiments, however, system 600 may operate in accordance with any other suitable communication standard or specification that uses MIMO signals, such as, for example, Wideband Code Division Multiple Access (WCDMA), WiMAX or WiFi systems.

The embodiment of FIG. 6 illustrates a receiver 620 in the system 600. In an embodiment, the receiver 620 may comprise: a predicting device 621, configured to predict a forthcoming PM which is expected to be used in the next transmission by using the method for predicting precoding matrix in a MIMO System of the present invention; an obtaining device 622, configured to obtain a quantized focusing factor and a quantized index of the target PM by using the method for predicting precoding matrix in a MIMO System of the present invention; and a feedback device 623, configured to feed back the quantized focusing factor and the quantized index of the target PM to a transmitter. In the present invention, the process of feeding back the quantized focusing factor is referred as long-term feedback, and the process of feeding back the quantized index of the target PM is referred as short-term feedback.

In an embodiment, feedback device 623 may comprise: means for signaling the quantized focusing factor at a transmission interval multiple times of the transmission interval at which the quantized index of the target PM is signaled.

In another embodiment, feedback device 623 may comprise: means for appending each bit of the quantized focusing factor to the quantized index of the target PM in a most-significant-bit order; and means for signaling the appended quantized index to the transmitter.

The embodiment of FIG. 6 illustrates a transmitter 610 in the system 600. In an embodiment, the transmitter 610 may comprise: a receiving device 611, configured to receive a quantized focusing factor and a quantized index of the target PM obtained by using the method for predicting PM in a MIMO System of the present invention; a restoring device 612, configured to restore a forthcoming PM which is expected to be used in the next transmission, based on a root codebook and the quantized focusing factor and the quantized index of the target PM; and a transmitting device 613, configured to perform the next transmission to a receiver by using the forthcoming PM.

Figure 7:
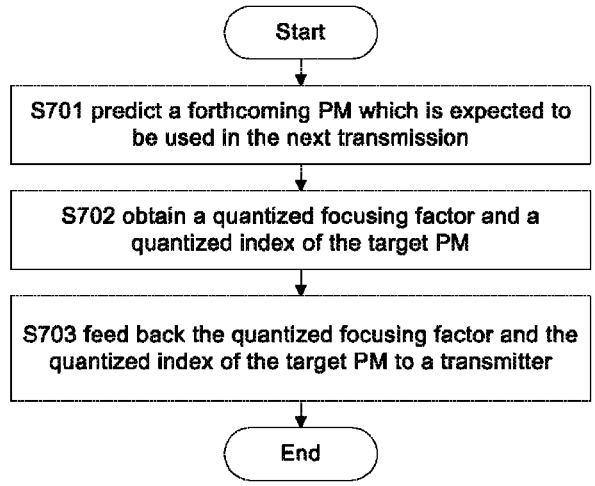
FIG. 7 illustrates a flow chart of a method for communication with a predicted PM in a FDD MIMO system according to an embodiment of the invention.

FIG. 7 illustrates a flow chart of a method for communication with a predicted PM in a FDD MIMO system according to an embodiment of the invention. The method illustrated in FIG. 7 can be performed by the receiver 620 of the FDD MIMO system 600.

At step S701, the predicting device 621 of the receiver 620 can predict a forthcoming PM which is expected to be used in the next transmission by using the method for predicting PM in a MIMO System of the present invention.

At step S702, the obtaining device 622 of the receiver 620 can obtain a quantized focusing factor and a quantized index of the target PM by using the method for predicting PM in a MIMO System of the present invention.

At step S703, the feedback device 623 of the receiver 620 can feed back the quantized focusing factor and the quantized index of the target PM to a transmitter, for example, the transmitter 610 in FIG. 6.

In an embodiment of the invention, the feedback device 623 may signal the quantized focusing factor at a transmission interval multiple times of the transmission interval at which the quantized index of the target PM is signaled.

In an embodiment of the invention, the feedback device 623 may append each bit of the quantized focusing factor to the quantized index of the target PM in a most-significant-bit order; and signal the appended quantized index to the transmitter.

Then, the flow of the embodiment of FIG. 7 ends.

Figure 8:
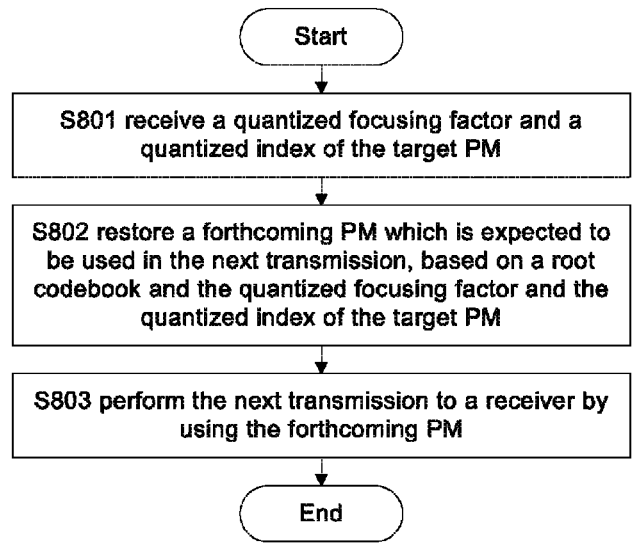
FIG. 8 illustrates a flow chart of a method for communication with a predicted PM in a FDD MIMO system according to an embodiment of the invention.

FIG. 8 illustrates a flow chart of a method for communication with a predicted PM in a FDD MIMO system according to an embodiment of the invention. The method illustrated in FIG. 8 can be performed by the transmitter 610 of the FDD MIMO system 600.

At step S801, the receiving device 611 of the transmitter 610 can receive a quantized focusing factor and a quantized index of the target PM obtained by using the method for predicting PM in a MIMO System of the present invention.

At step S802, the restoring device 612 of the transmitter 610 can restore a forthcoming PM which is expected to be used in the next transmission, based on a root codebook and the quantized focusing factor and the quantized index of the target PM.

At step S803, the transmitting device 613 of the transmitter 610 can perform the next transmission to a receiver by using the forthcoming PM.

Then, the flow of the embodiment of FIG. 8 ends.

Figure 9:
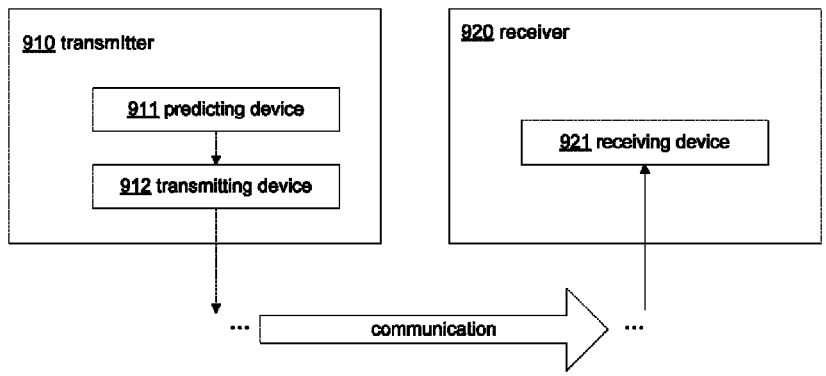
FIG. 9 illustrates block diagrams of a transmitter and a receiver in a TDD MIMO system according to an embodiment of the invention.

The embodiment of FIG. 9 illustrates block diagrams of a transmitter and a receiver in a TDD MIMO system 900 according to an embodiment of the invention.

In the embodiment of FIG. 9, system 900 may be an LTE or LTE-A system. In alternative embodiments, however, system 900 may operate in accordance with any other suitable communication standard or specification that uses MIMO signals, such as, for example, Wideband Code Division Multiple Access (WCDMA), WiMAX or WiFi systems.

The embodiment of FIG. 9 illustrates a transmitter 910 in the system 900. In an embodiment, the transmitter 910 may comprise: a predicting device 911, configured to predict a PM which is expected to be used in next transmission by using the method for predicting PM in a MIMO System of the present invention; and a transmitting device 912, configured to perform the next transmission to a receiver by using the predicted PM.

The embodiment of FIG. 9 also illustrates a receiver 920 in the system 900. In an embodiment, the receiver 920 may comprise: a receiving device 921, configured to receive, from a transmitter, transmission encoded with a PM which is predicted by using the method for predicting PM in a MIMO System of the present invention.

Figure 10:
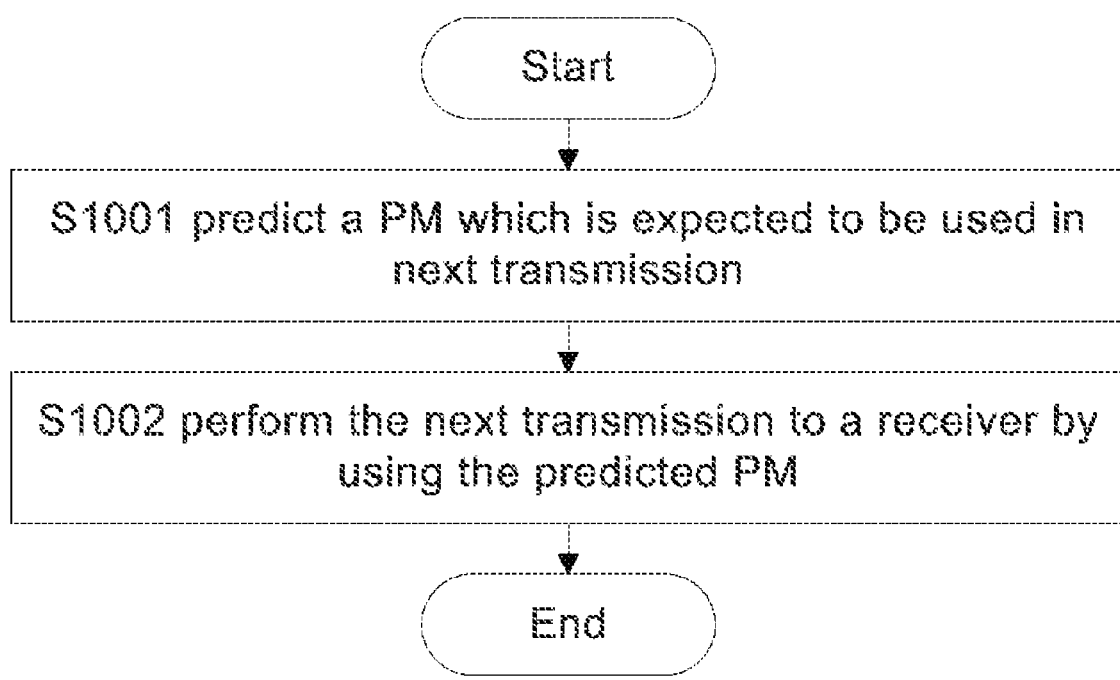
FIG. 10 illustrates a flow chart of a method for communication with a predicted PM in a TDD MIMO system according to an embodiment of the invention.

FIG. 10 illustrates a flow chart of a method for communication with a predicted PM in a FDD MIMO system according to an embodiment of the invention. The method illustrated in FIG. 10 can be performed by the transmitter 910 of the TDD MIMO system 900.

At step S1001, the predicting device 911 of the transmitter 910 can predict a PM which is expected to be used in next transmission by using the method for predicting PM in a MIMO System of the present invention.

At step S1002, the transmitting device 912 of the transmitter 910 can perform the next transmission to a receiver by using the predicted PM.

Then, the flow of the embodiment of FIG. 10 ends.

The method which can be performed by the receiver 920 of the TDD MIMO system 900 may comprise the step of receiving, from a transmitter, transmission encoded with a PM which is predicted by using the method for predicting PM in a MIMO System of the present invention.

Embodiments of the present invention may also be implemented as a computer program product, comprising at least one computer readable storage medium having a computer readable program code portion stored thereon. In such embodiments, the computer readable program code portion comprises at least codes for performing the method for predicting PM in a MIMO System. In an embodiment, a computer program may comprise: codes for obtaining a present PM based on the present transmission; codes for fitting the present PM and previous PMs with a predefined model; and codes for determining a forthcoming PM which is expected to be used in the next transmission based on the fitting.

Based on the above description, the skilled in the art would appreciate that the present invention may be embodied in an apparatus, a method, or a computer program product. Thus, the present invention may be specifically implemented in the following manners, i.e., complete hardware, complete software (including firmware, resident software, microcode, etc), or a combination of software part and hardware part as generally called "circuit," "module," or "system" herein. Further, the present invention may also adopt a form of computer program product as embodied in any tangible medium of expression, the medium comprising computer-usable program code.

Any combination of one or more computer-usable or computer-readable mediums may be used. The computer-usable or computer-readable medium may be for example, but not limited to, electrical, magnetic, optical, electromagnetic, infrared, or semiconductor system, means, device, or propagation medium. More specific examples (non-exhaustive list) of the computer-readable medium comprise: an electric connection having one or more leads, a portable computer magnetic disk, hard disk, random access memory (RAM), read-only memory (ROM), erasable programmable read-only memory (EPROM or flash), optical fiber, portable compact disk read-only memory (CD-ROM), optical storage device, a transmission medium for example, supporting internet or intranet, or a magnetic storage device. It should be noted that the computer-usable or computer readable medium may even be a paper printed with a program thereon or other suitable medium, because the program may be obtained electronically by electrically scanning such paper or other medium, and then compiled, interpreted or processed in a suitable manner, and if necessary, stored in a computer memory. In the context of the present document, a computer-usable or computer-readable medium may be any medium containing, storing, communicating, propagating, or transmitting a program available for an instruction execution system, apparatus or device, or associated with the instruction execution system, apparatus, or device. A computer-usable medium may comprise a data signal contained in a base band or propagated as a part of carrier and embodying a computer-usable program code. A computer-usable program code may be transmitted by any suitable medium, including, but not limited to, radio, wire, cable, or RF, etc.

A computer program code for executing operations of the present invention may be written by any combination of one or more program design languages, the program design languages including object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, including local area network (LAN) or wide area network (WAN), or connected to external computer (for example, by means of an internet service provider via Internet).

Further, each block in the flow charts and/or block diagrams of the present invention and combination of respective blocks therein may be implemented by computer program instructions. These computer program instructions may be provided to a processor of a general purpose computer, a dedicated computer or other programmable data processing apparatus, thereby generating a machine such that these instructions executed through the computer or other programmable data processing apparatus generate means for implementing functions/operations prescribed in the blocks of the flow charts and/or block diagrams.

These computer program instructions may also be stored in a computer-readable medium capable of instructing the computer or other programmable data processing apparatus to work in a particular manner, such that the instructions stored in the computer-readable medium generate a product including instruction means for implementing the functions/operations prescribed in the flow charts and/or block diagrams.

The computer program instructions may also be loaded on a computer or other programmable data processing apparatus, such that a series of operation steps are implemented on the computer or other programmable data processing apparatus, to generate a computer-implemented process, such that execution of the instructions on the computer or other programmable apparatus provides a process of implementing the functions/operations prescribed in the blocks of the flow charts and/or block diagrams.

Though the exemplary embodiments of the present invention are described herein with reference to the drawings, it should be understood that the present invention is not limited to these accurate embodiments, and a person of normal skill in the art can make various modifications to the embodiments without departing from the scope and principle of the present invention. All such variations and modifications are intended to be included in the scope of the present invention as defined in the appended claims.

What is claimed is:

1. A method for predicting precoding matrix (PM) in a MIMO System, comprising:
   obtaining a present PM based on a present transmission;
   fitting the present PM and previous PMs with a predefined model; and
   determining a forthcoming PM which is expected to be used in the next transmission based on the fitting, wherein determining the forthcoming PM which is expected to be used in the next transmission based on the fitting comprises:
determining a step size based on the fitting;
extrapolating on the fitting result with the step size, based on the predefined model; and
obtaining the forthcoming PM based on the extrapolation, and
wherein determining the step size based on the fitting comprises:
defining a plurality of PMs by using different step sizes based on the fitting;
calculating an error metric between each of the plurality of PMs and a set of the previous PMs; and
determining a step size corresponding to the maximum error metric.

2. The method of claim 1, wherein fitting the present PM and previous PMs with the predefined model comprises:
evaluating goodness-of-fit of a plurality of predefined models based on the present PM and the previous PMs; and
selecting the model with the best goodness-of-fit as the predefined model.

3. The method of claim 2, wherein evaluating goodness-of-fit of the plurality of models based on the present PM and the previous PMs comprises:
calculating an error metric between each of the plurality of models and a set of present PM and the previous PMs; and
determining the model corresponding to the minimum error metric as a model with the best goodness-of-fit.

4. The method of claim 1, wherein fitting the present PM and previous PMs with a predefined model comprises:
fitting the present PM and previous PMs with a curve on a Grassmannian manifold.

5. The method of claim 1, wherein obtaining the forthcoming PM based on the extrapolation comprises:
calculating a focusing factor according to the previous PMs and previously predicted PMs;
focalizing a PM set on the forthcoming PM by using the focusing factor based on a root codebook;
selecting, from the PM set, the most similar PM to the forthcoming PM as a target PM; and
determining the index of the target PM in the PM set.

6. The method of claim 5, wherein calculating the focusing factor according to the previous PMs and previously predicted PMs comprises:
calculating, with one of a plurality of candidate focusing factors, the sum of error metrics between the previous PMs and previously predicted PMs, wherein one sum corresponds to one of the plurality of candidate focusing factors;
determining the candidate focusing factor corresponding to the minimum sum as the focusing factor; and
quantizing the focusing factor so as to be fed back to a transmitter.

7. The method of claim 5, wherein focalizing the PM set on the present PM by using the focusing factor based on a root codebook comprises:
calculating a rotation matrix based on the present PM and the reference point of the root codebook;
focalizing a set of reference PMs on the reference point by applying the focusing factor to the root codebook; and
calculating the PM set based on the rotation matrix and the set of reference PMs.

8. The method of claim 5, wherein determining the index of the target PM in the PM set further comprises:
quantizing the index so as to be fed back to a transmitter.

9. A method for communication with a predicted precoding matrix (PM) in a FDD MIMO system, comprising:
predicting a forthcoming PM which is expected to be used in the next transmission by using the method of claim 1;
obtaining a quantized focusing factor and a quantized index of a target PM; and
feeding back the quantized focusing factor and the quantized index of the target PM to a transmitter.

10. The method of claim 9, wherein feeding back the quantized focusing factor and the quantized index of the target PM to the transmitter comprises:
signaling the quantized focusing factor at a transmission interval multiple times of the transmission interval at which the quantized index of the target PM is signaled.

11. The method of claim 9, wherein feeding back the quantized focusing factor and the quantized index of the target PM to the transmitter comprises:
appending each bit of the quantized focusing factor to the quantized index of the target PM in a most-significant-bit order; and
signaling the appended quantized index to the transmitter.

12. A receiver in a FDD MIMO system, comprising:
a predicting device, configured to predict a forthcoming precoding matrix (PM) which is expected to be used in the next transmission by using the method of claim 1;
an obtaining device, configured to obtain a quantized focusing factor and a quantized index of a target PM; and
a feedback device, configured to feed back the quantized focusing factor and the quantized index of the target PM to a transmitter.

13. The receiver of claim 12, wherein the feedback device comprises:
means for signaling the quantized focusing factor at a transmission interval multiple times of the transmission interval at which the quantized index of the target PM is signaled.

14. The receiver of claim 12, wherein the feedback device comprises:
means for appending each bit of the quantized focusing factor to the quantized index of the target PM in a most-significant-bit order; and
means for signaling the appended quantized index to the transmitter.

15. An apparatus for predicting precoding matrix (PM) in a MIMO System, comprising:
an obtaining device, configured to obtain a present PM based on a present transmission;
a fitting device, configured to fit the present PM and previous PMs with a predefined model; and
a determining device, configured to determine a forthcoming PM which is expected to be used in a next transmission based on fitting of the fitting device,
wherein the determining device comprises:
means for determining a step size based on the fitting;
means for extrapolating on the fitting result with the step size, based on the predefined model; and
means for obtaining the forthcoming PM based on the extrapolation, and
wherein the means for determining the step size based on the fitting comprises:
means for defining a plurality of PMs by using different step sizes based on the fitting;
means for calculating an error metric between each of the plurality of PMs and a set of the previous PMs; and means for determining a step size corresponding to the maximum error metric.

16. The apparatus of claim 15, wherein the fitting device comprises:
means for evaluating goodness-of-fit of a plurality of predefined models based on the present PM and the previous PMs; and
means for selecting the model with the best goodness-of-fit as the predefined model.

17. The apparatus of claim 16, wherein the means for evaluating goodness-of-fit of the plurality of models based on the present PM and the previous PMs comprises:
means for calculating an error metric between each of the plurality of models and a set of the present PM and the previous PMs; and
means for determining the model corresponding to the minimum error metric as a model with the best goodness-of-fit.

18. The apparatus of claim 15, wherein the fitting device comprises:
means for fitting the present PM and previous PMs with a curve on a Grassmannian manifold.

19. The apparatus of claim 15, wherein the means for obtaining the forthcoming PM based on the extrapolation comprises:
means for calculating a focusing factor according to the previous PMs and previously predicted PMs;
means for focalizing a PM set on the forthcoming PM by using the focusing factor based on a root codebook;
means for selecting, from the PM set, the most similar PM to the forthcoming PM as a target PM; and
means for determining the index of the target PM in the PM set.

20. The apparatus of claim 19, wherein the means for calculating a focusing factor according to the previous PMs and previously predicted PMs comprises:
means for calculating, with one of a plurality of candidate focusing factors, the sum of error metrics between the previous PMs and previously predicted PMs, wherein one sum corresponds to one of the plurality of candidate focusing factors;
means for determining the candidate focusing factor corresponding to the minimum sum as the focusing factor; and
means for quantizing the focusing factor so as to be fed back to a transmitter.

21. The apparatus of claim 19, wherein the means for focalizing a PM set on the present PM by using the focusing factor based on a root codebook comprises:
means for calculating a rotation matrix based on the present PM and the reference point of the root codebook;
means for focalizing a set of reference PMs on the reference point by applying the focusing factor to the root codebook; and
means for calculating the PM set based on the rotation matrix and the set of reference PMs.

22. The apparatus of claim 19, wherein the means for determining the index of the target PM in the PM set further comprises:
means for quantizing the index so as to be fed back to a transmitter.

23. A method for predicting precoding matrix (PM) in a MIMO System, comprising:
obtaining a present PM based on a present transmission;
fitting the present PM and previous PMs with a predefined model; and
determining a forthcoming PM which is expected to be used in the next transmission based on the fitting,
wherein determining the forthcoming PM which is expected to be used in the next transmission based on the fitting comprises:
determining a step size based on the fitting;
extrapolating on the fitting result with the step size, based on the predefined model; and
obtaining the forthcoming PM based on the extrapolation, and
wherein obtaining the forthcoming PM based on the extrapolation comprises:
calculating a focusing factor according to the previous PMs and previously predicted PMs;
focalizing a PM set on the forthcoming PM by using the focusing factor based on a root codebook;
selecting, from the PM set, the most similar PM to the forthcoming PM as a target PM; and
determining the index of the target PM in the PM set.

* * * * *